June 14, 1932. M. C. LUDLAM 1,862,576
SPRINKLER
Filed Oct. 5, 1928 2 Sheets-Sheet 1

INVENTOR.
MALCOLM C. LUDLAM
BY *Leon Edelson*
ATTORNEY.

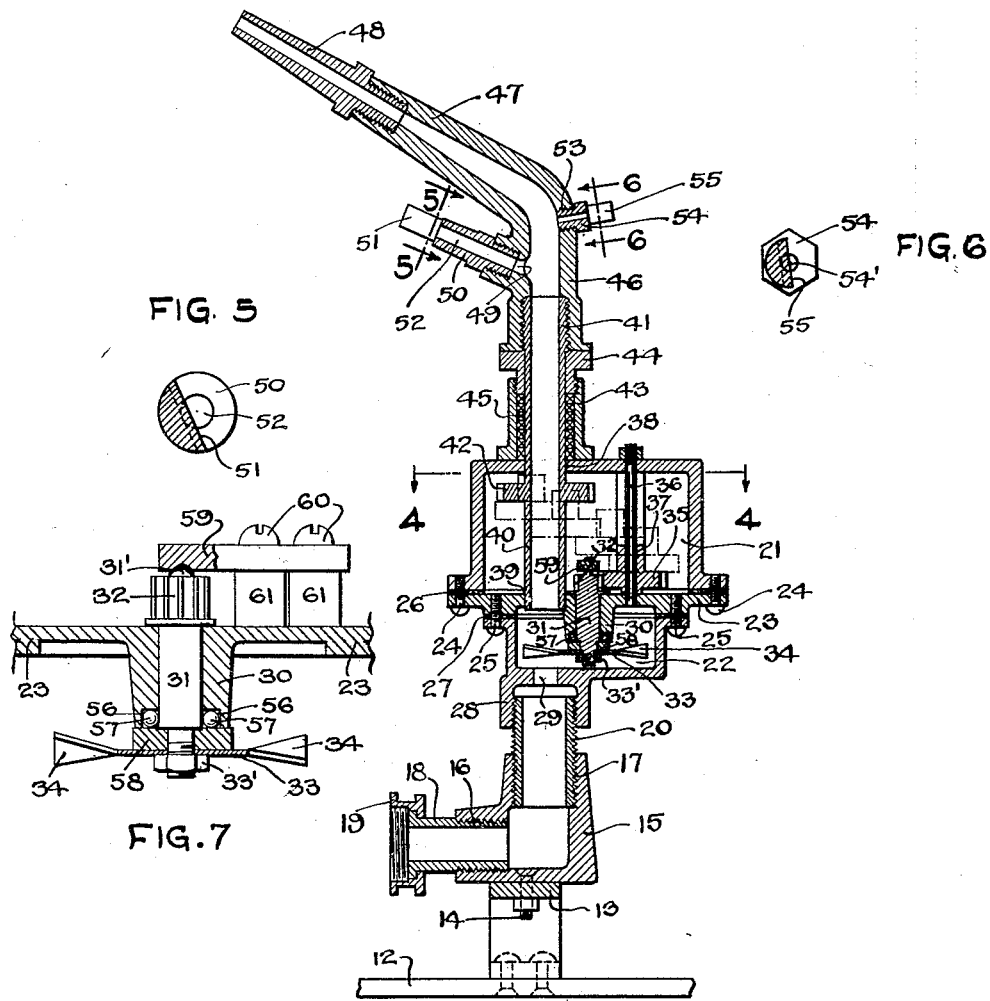
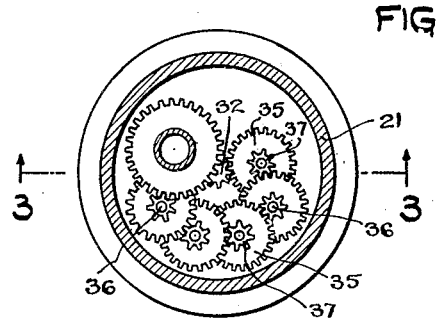

Patented June 14, 1932

1,862,576

UNITED STATES PATENT OFFICE

MALCOLM C. LUDLAM, OF WOODBURY, NEW JERSEY

SPRINKLER

Application filed October 5, 1928. Serial No. 310,563.

This invention relates to improvements in irrigation sprinklers, more particularly of the type employing a rotatable distributing head operable by the action of the water as it flows through the sprinkler.

Irrigation sprinklers of the class to which this invention appertains have been more or less extensively used for watering lawns, golf courses, and the like, by reason of the fact that they are capable of irrigating comparatively large areas. Considerable difficulty, however, has been experienced in obtaining a uniform distribution of water over the full circular area covered by the sprinkler, this being due primarily to the fact that, prior to this invention, no adequate provision was made for uniformly distributing water over the areas located between the sprinkler itself and the outermost circular area of distribution.

It is accordingly among the principal objects of this invention to obviate the aforementioned difficulty by providing a sprinkler which is capable of uniformly irrigating a very large circular area in such manner that water is evenly distributed to every intermediate section thereof.

More specifically, it is an object of the invention to provide a sprinkler unit capable of rotating very slowly through the action of the water upon a suitable impeller, the unit being provided with means for simultaneously projecting a plurality of streams, respectively differing in length, shape and angle of projection, over the area to be irrigated whereby to obtain a more uniform distribution or spread of water at every point along the radial lines extending from the unit as a center to the maximum radial distance to which the water is projected.

A further object of the invention is the provision of a means operable to produce a very slow rotation of the distributing head without interfering with the even distribution of water from the several nozzles thereof.

A still further object of the invention is the provision of an irrigation sprinkler which is simple and rugged in construction, which permits ready inspection, repairs and replacement of parts, and which is at the same time extremely efficient and durable in use.

Other objects and advantages of the invention will be apparent more fully hereinafter.

With the above and other objects and advantages in mind, the invention consists substantially in the combination, construction, location and relative arrangement of parts, all as will be described more fully hereinafter, as shown in the accompanying drawings, and as finally pointed out in the appended claims.

In the accompanying drawings, which illustrate a preferred form of the invention:

Figure 3 is a vertical sectional view taken on the line 3—3 of Fig. 4;

Figure 4 is a horizontal section taken on the line 4—4 of Figure 3;

Figure 1:
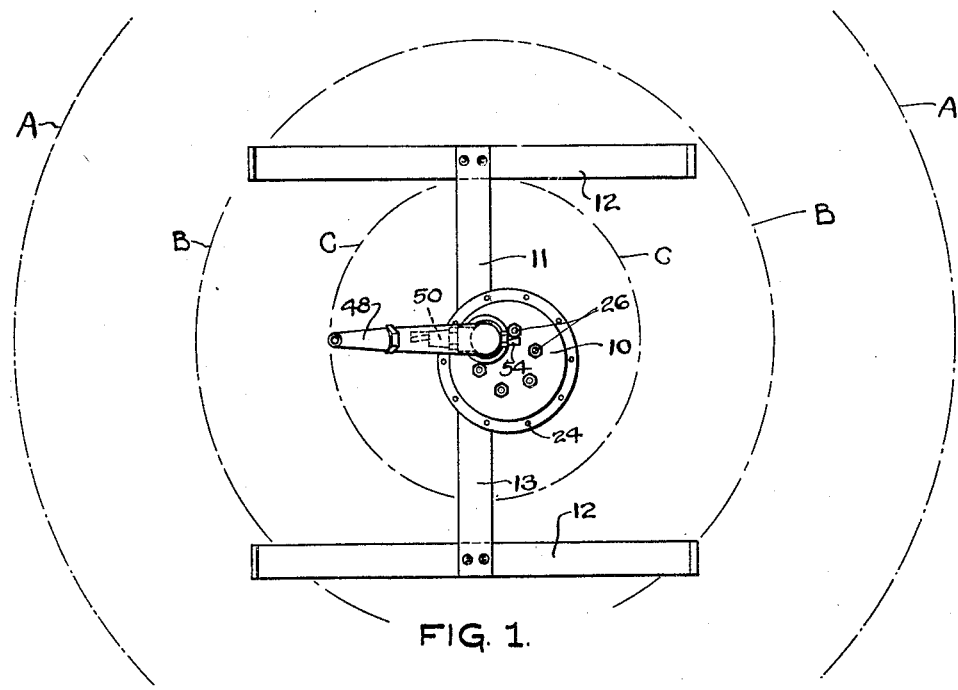
Figure 1 is a top plan view of the sprinkler constructed in accordance with this invention.
Figure 2:
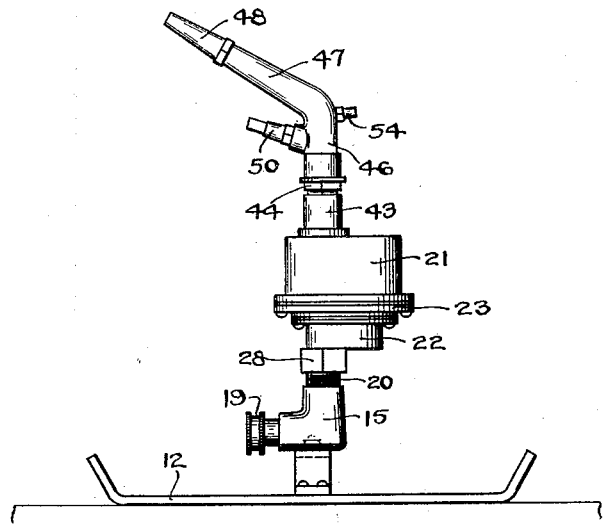
Figure 2 is a side elevational view of the sprinkler.

Figures 5 and 6 are enlarged sectional views taken respectively on lines 5—5 and 6—6 of Figure 3; and Figure 7 is an enlarged vertical sectional view of the impeller and its associated parts.

Referring now to the drawings, the sprinkler generally comprises the distributing unit 10 and the standard 11 upon which the unit is mounted, this standard being preferably constructed of a pair of spaced longitudinally extending members 12 suitably interconnected by a transversely extending member having an intermediate portion 13 elevated somewhat above the common plane of the members 12. Suitably mounted upon the raised portion 13 of the standard, preferably by means of one or more bolts 14, is an inlet fitting 15 of generally angular form having a horizontally extending opening 16 communicating with a vertically extending opening 17. Threadedly received within the horizontal opening 16 is a nipple 18 upon the outer end of which is secured a coupling ring 19 for connection with a hose or other source of water supply.

Threaded into the vertically extending opening 17 is a threaded stem or nipple 20 which in turn supports the distributing unit designated generally by the reference numeral 10. As appears most clearly in Figure 3 this unit comprises, among other elements, a gear reduction chamber 21, and an impeller chamber 22, the interiors of which are suitably separated from each other by a horizontally disposed wall or partition 23. Preferably this partition is removably secured to the bottom of the gear reduction chamber 21 by the screws 24 the impeller chamber 22 being in turn removably secured to the partition by the screws 25. Suitable gaskets 26 and 27 may be respectively disposed between the chamber 21 and the partition 23 and between said partition and the chamber 22. The impeller chamber 22 is preferably formed adjacent one edge thereof with a downwardly projecting internally threaded extension 28 for receiving the upper end of the vertical supporting stem 20. An opening 29, coaxial with the threaded extension 28, is provided in the bottom wall of the impeller chamber, this opening being thus in registry with the vertically extending bore of the inlet fitting 15 but arranged to one side of the vertical axis of the chamber 22.

Projecting downwardly into the interior of the impeller chamber is a vertical bearing sleeve 30 formed integrally on the partition member 23, the vertical axis of this sleeve being substantially coincident with that of the impeller chamber. Supported for rotation within the bore of this sleeve 30 is a vertical shaft or spindle 31 the upper end of which extends into the gear reduction chamber 21 and is provided with a pinion 32. Secured to the lower end of the shaft 31, preferably by the lock nut 33', is an impeller member 33, the peripheral margin of which is provided with a series of circumferentially arranged vanes 34 adapted to be struck by the stream of water passing upwardly through the opening 29. The action of the water in impinging against the vanes 34 causes the impeller member 33 to be rotated, thereby imparting rotation to the pinion 32 through the shaft 31.

To effectually preclude the possibility of the stem 31 from binding in its bearing sleeve 30 due to side thrust, the lower end of the sleeve 30 is provided with an internal raceway 56 within which are positioned a plurality of ball-bearings 57. These ball-bearings 57 are held in position by a suitable collar 58 slipped over the reduced end of the shaft 31 and interposed between the impeller member 33 and the lower end of the bearing sleeve 30. Preferably, the upper extremity 31' of the shaft 31 bears against an end-thrust bearing member 59 which is suitably secured to the plate 23 by the screws 60 co-operating with the spacers 61, which latter, of course, serve to space the bearing member 59 the desired vertical distance above the plate 23. Thus, by means of the construction just described, it will be apparent that all excessive side thrust and end play which may be induced by the action of the water upon the vanes of the impeller members is effectually precluded.

Meshing with the pinion 32 is a spur gear 35 rotatable about a fixed spindle 36. The spur gear 35 is formed integral with a second pinion 37 which latter meshes with a second spur gear which, through its associated pinion (similar to the pinion 37) drives a third spur gear, and so on through the train of gearing shown by the dotted lines in Figure 3. Each spur gear 35 and its integrally formed pinion 37 is rotatable about a fixed spindle similar to the spindle 36, five such spindles being employed in the present instance.

Provided respectively in the top wall of the gear reduction chamber 21 and in the partition 23 are a pair of vertically aligned openings 38 and 39, the vertical axes of which coincide with the axis of the opening 29. Extending vertically through the openings 38 and 39 is a tubular member 40 the lower end of which terminates immediately below the partition 23 while the upper portion thereof, which projects a considerable distance exteriorly of the top wall of the chamber 21 is provided with an externally threaded end 41. Suitably secured to that portion of the tubular member 40 which is included within the chamber 21 is a spur gear 42 adapted for meshing or engaging with the pinion 37 furtherest removed from the pinion 32. By reason of the entrainment so effected between the pinion 32 and the spur gear 42 a very slow rotative movement will be imparted to the tubular member 40 upon rotation of the impeller member 33 through the action of the water striking against the impeller vanes. If desired, the gear reduction chamber 21 may be packed with grease or other suitable lubricant.

Arranged exteriorly of the tubular member 40 immediately above the chamber 21 is a sleeve 43, the upper end of which threadedly receives a packing gland 44 for retaining in position a suitable packing 45. Threadedly secured upon the upper end 41 of the rotatable tubular member 40 is a pipe section 46 of generally angular form, the upper branch 47 of which is inclined upwardly with respect to the horizontal, preferably at about 35 degrees. Fitted in the outer extremity of the inclined branch 47 of this pipe section is a suitable nozzle 48, the water which is supplied thereto passing through the opening 29, then between the impeller vanes 34 and finally through the communicating bores of the rotating members 40 and 46. Depending upon the water pressure at the source, various sizes of nozzles, such as 48, may be employed for projecting the water to greater or less distances, it being understood that this nozzle distributes the water over a circular band of ground, the innermost boundary of which is a considerable distance from the sprayer. In Figure 1, the dotted lines A—B define the area or zone irrigated by the water directed from the nozzle 48, it being understood, of course, that the scale upon which this zone and those to be mentioned hereinafter are drawn is much smaller than that of the sprinkler shown in the figure.

Formed in the vertically extending branch of the pipe section 46 is an outlet 49 within which is threadedly received a nozzle 50. This nozzle 50 also projects upwardly but the inclination thereof with respect to the horizontal is less than that of the nozzle 48. Furthermore, the nozzle 50 is provided at its outer end with a baffle or deflecting blade 51 which is so arranged with respect to the bore 52 of the nozzle that it produces a substantially fan-shaped spray of water. Preferably, the water deflecting surface of the blade 51, which surface is flat, is arranged in a plane making an angle with the plane passing through the line 3—3 of Figure 4. The nozzle 50 is designed to distribute water over the area or zone defined by the dotted lines B—C of Figure 1, it being understood that this nozzle rotates with the nozzle 48. Preferably, but not necessarily, the nozzle 50 is disposed substantially in the vertical plane of the inclined branch 47 of the rotatable pipe section 46.

Provided in the pipe section 46 opposite and preferably located somewhat above the outlet 49 is another outlet 53 within which is threadedly received a third nozzle 54 similar in type to the nozzle 50. The nozzle 54 is, however, smaller than the nozzle 50 and is arranged with its bore 54' making only a slight angle with the horizontal. Like the nozzle 50, the nozzle 54 is also provided at its outer end with a flat deflecting blade 55, the water deflecting surface of which makes a slight angle with the vertical plane passing through the line 3—3 of Figure 4. The result is that this nozzle 54 produces a substantially fan-shaped spray which is almost vertical. By reason of the fact that the nozzle 54 is the smallest one of the three with which the sprinkler is equipped, also because the spray which it produces lies in a substantially vertical plane, and finally because the bore of this nozzle is of less inclination to the horizontal than either of the other nozzles, the area or zone which is bounded by the dotted line C of Figure 1 is provided with a uniform distribution of water.

From the foregoing it will be apparent that the sprinkler as hereinbefore described is capable of uniformly distributing water over every portion of the circular area defined by the dotted line A. In other words, as the distributing head of the sprinkler rotates due to the action of the water upon the impeller blades, three separate and distinct streams of water are projected simultaneously over the area to be irrigated, these several streams being arranged to somewhat overlap each other. Inasmuch as these streams differ in length, shape and angle of projection, there is effectually precluded all possibility of an unequal distribution of water over the entire circular area to be irrigated, particularly over those areas or zones which are in closest proximity to the sprinkler. The rate of speed at which the distributing head rotates being dependent upon the ratio of the reduction gearing it becomes possible, by merely varying this ratio, to obtain any desired rate of speed.

It will be understood, of course, that various changes may be made from time to time without departing from the spirit or principles of the invention, and it is accordingly intended to claim the same broadly, as well as specifically, as indicated by the appended claims.

What is claimed as new and useful is:

1. In a sprinkler, in combination, a supporting member having a vertically extending passage, a substantially closed casing carried by said member, said casing being divided into a pair of vertically spaced chambers constituting respectively a gear housing and an impeller housing, an impeller arranged for rotation within its housing about a vertical axis offset from that of said vertically extending passage, a tubular stem extending through the gear housing and rotatable about an axis coincident with that of said passage, and means including a plurality of gears for imparting rotation to said tubular stem upon rotation of said impeller, said impeller housing being provided with an opening therein interposed between and in registry with said passage and stem and through which fluid is directed against the marginal portion of said impeller and upwardly through said tubular stem.

2. In a sprinkler, in combination, a fluid inlet member having a vertically extending passage, a tubular stem disposed above and in vertical alinement with said passage, an impeller member rotatable about a vertical axis offset from the common axis of said passage and stem, said impeller being provided in its margin with a plurality of vanes arranged to traverse the space between the proximate ends of said stem and passage, and means for imparting rotation to said tubular stem upon rotation of said impeller by the action of the fluid impinging against the impeller vanes, said fluid being directed upwardly between said vanes and through said tubular stem.

In testimony whereof, I have hereunto affixed my signature.

MALCOLM C. LUDLAM.